United States Patent [19]

Peters

[11] Patent Number: 4,727,752

[45] Date of Patent: Mar. 1, 1988

[54] PSEUDOSINUSOIDAL OSCILLATOR DRIVE SYSTEM

[75] Inventor: Rex B. Peters, Woodinville, Wash.

[73] Assignee: Sundstrand Data Control, Inc., Redmond, Wash.

[21] Appl. No.: 10,799

[22] Filed: Feb. 4, 1987

[51] Int. Cl.$^4$ .................... G01P 15/10; H03B 5/32
[52] U.S. Cl. .................... 73/517 AV; 73/DIG. 1; 331/65; 331/158
[58] Field of Search ............. 73/517 AV, DIG. 1; 331/65, 158, 156

[56] References Cited

U.S. PATENT DOCUMENTS

| | | |
|---|---|---|
| 3,992,680 | 11/1976 | Herzl . |
| 4,213,185 | 7/1980 | Muri et al. . |
| 4,227,158 | 10/1980 | Schroeder et al. ............ 331/158 |
| 4,295,098 | 10/1981 | Crowley . |
| 4,349,887 | 9/1982 | Crowley . |
| 4,368,432 | 1/1983 | Levy . |
| 4,404,430 | 9/1983 | Ogita . |
| 4,409,555 | 10/1983 | Min et al. . |
| 4,484,296 | 11/1980 | Treise et al. . |
| 4,494,073 | 1/1985 | Sorgi . |
| 4,573,024 | 2/1986 | Carlqvist . |
| 4,587,497 | 5/1986 | Keller et al. . |
| 4,628,735 | 12/1986 | Kirkpatrick ............ 73/517 AV |
| 4,631,694 | 12/1986 | Single . |

Primary Examiner—John Chapman

Attorney, Agent, or Firm—Christensen, O'Connor, Johnson & Kindness

[57] ABSTRACT

A circuit (62, 64) for receiving a periodic input signal at frequency f, and for producing a pseudosinusoidal staircase output signal at a fundamental frequency f from which predetermined harmonics of the fundamental frequency are absent. Also provided are an oscillator in which such a circuit forms the drive circuit for a piezoelectric crystal, and an accelerometer in which such an oscillator is used as the force sensing means. In the accelerometer, the reaction force of a proof mass (40) is sensed by a resonator that comprises a drive circuit (44) for producing a drive signal and a piezoelectric crystal (42) connected between the proof mass and support (46). In response to the drive signal, the crystal undergoes mechanical vibration at a frequency f that varies with the force applied to the crystal. A resonator signal corresponding to the mechanical vibration is produced and input to drive circuit. The drive circuit responds by producing the drive signal in the form of a periodic, pseudosinusoidal staircase function. The staircase function has fundamental frequency f, and has N steps of M discrete nonzero amplitude levels per period. N and M are integers greater than one, with M being less than N. The drive circuit produces the M amplitude levels such that predetermined harmonics of the fundamental frequency f are not present in the drive signal, thereby reducing the possibility of activity dips in the accelerometer output.

16 Claims, 11 Drawing Figures

PSEUDOSINUSOIDAL OSCILLATOR DRIVE SYSTEM

FIELD OF THE INVENTION

The present invention relates to crystal oscillators, and to transducers such as accelerometers that use oscillators to produce output signals having frequencies corresponding to the force to which the transducer is subjected.

BACKGROUND OF THE INVENTION

In vibrating beam accelerometers, and in related sensors for measuring force or pressure, a force sensitive crystal controlled oscillator is used to convert a force into a corresponding shift of a carrier frequency. The oscillator includes a piezoelectric crystal having a size and shape adapted for a particular application. An electronic drive circuit maintains the piezoelectric crystal in oscillation by amplifying its output, and feeding the output back as an in-phase drive signal. The electronics for producing the drive signal may be either digital (square wave drive) or analog (sine wave drive).

The advantages of digital electronics are that they are relatively simple, they have low power consumption, and they self-limit for drive amplitude. However, digital drive signals are rich in harmonics that tend to excite overtones in the crystals, resulting in local nonlinearities termed "activity dips." Analog circuits are free of harmonics, but consume more power and require complex amplitude controls. For either digital or analog drive systems, performance in dynamic environments is sometimes compromised by the relatively low operating frequencies of the commonly used bending beam type crystals. The processing of frequency into an estimate of the force could be simplified if the crystals operated at much higher frequencies, e.g., 5-10 MHz, instead of the more typical values of 30-40 KHz.

SUMMARY OF THE INVENTION

In its most basic form, the present invention provides a circuit for receiving a periodic input signal at frequency f, and for producing a pseudosinusoidal staircase output signal at a fundamental frequency f from which predetermined harmonics of the fundamental frequency are absent. The present invention also provides an oscillator in which such a circuit forms the drive circuit for a piezoelectric crystal, and an accelerometer in which such an oscillator is used as the force sensing means.

A preferred embodiment of an accelerometer according to the present invention comprises a support, a proof mass, mounting means for mounting the proof mass to the support such that the proof mass can undergo movement along a sensitive axis, and a transducer for reacting to such movement by producing a signal indicative of acceleration along the sensitive axis. The transducer comprises a resonator, and drive circuit means for providing a drive signal for the resonator. The resonator comprises a piezoelectric crystal connected between the proof mass and the support, and constructed to undergo mechanical vibration at a frequency f that varies with the force applied to the crystal. The crystal vibrates in response to an electrical drive signal having a harmonic component at frequency f, and the resonator includes means for producing an electrical resonator signal corresponding to such mechanical vibration. The drive circuit means receives the resonator signal and produces the drive signal in the form of a periodic pseudosinusoidal staircase function. The staircase function has fundamental frequency f, and has N steps of M discrete nonzero amplitude levels per period, M and N being integers greater than one, with M being less than N. The drive circuit means includes means for producing the M amplitude levels such that predetermined harmonics of the fundamental frequency f are not present in the drive signal.

The circuit means may comprise first circuit means for receiving the resonator signal and for producing a periodic intermediate signal having frequency Nf and period 1/Nf, and second circuit means including means for receiving the intermediate signal and for producing the drive signal. The amplitude level of the drive signal changes at a series of switching times that are spaced from one another in time by integer multiples of the period of the intermediate signal. Specific forms for the drive signal are disclosed. In a preferred embodiment, the second circuit means comprises an N bit shift register and a level generation circuit. The intermediate signal is coupled to the clock terminal of the shift register, and means are provided for preloading the shift register with a predetermined bit pattern, and for causing the bit pattern to rotate through the shift register in response to the intermediate signal. The level generation circuit is connected to the N parallel output terminals of the shift register, such that a predetermined amplitude level of the drive signal is produced for each position of the bit pattern in the shift register.

BRIEF DESCRIPTION OF THE DRAWINGS

FIG. 6 is a graph showing one cycle of the staircase drive signal;

FIG. 7 is a circuit diagram of the frequency multiplier and staircase generator;

DETAILED DESCRIPTION OF THE INVENTION

Figure 1:
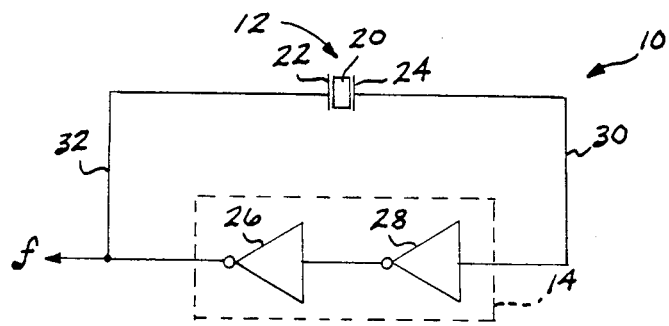
FIG. 1 is a schematic view of a prior art crystal oscillator.

FIG. 1 illustrates a conventional crystal oscillator 10 comprising resonator 12 and drive circuit 14. Resonator 12 comprises crystal 20 fabricated from a piezoelectric material such as crystalline quartz, and electrodes 22 and 24 formed on crystal 20 by means, and in a manner, well known to those skilled in the art. Drive circuit 14 comprises inverters 26 and 28. Vibration of crystal 20 results in a corresponding electrical resonator signal on line 30. The resonator signal is nearly sinusoidal, because the high Q of crystal 20 causes the crystal to function as a sharply-tuned bandpass filter. The resonator signal on line 30 is input to drive circuit 14, and the drive circuit produces a square wave drive signal on line 32 that is in-phase with the resonator signal. The drive signal is fed back to resonator 12 to maintain the vibration of crystal 20. The fundamental frequency of oscillation of oscillator 10 is primarily determined by the characteristics of crystal 20. In a force sensing application, the fundamental frequency f at which the crystal oscillates is a measure of the force to which the crystal is subjected. The illustrated drive technique is simple and efficient, but the square wave drive signal is rich in harmonics, specifically, the odd harmonics of the fundamental f at $3f$, $5f$, $7f$, etc.

Figure 2:
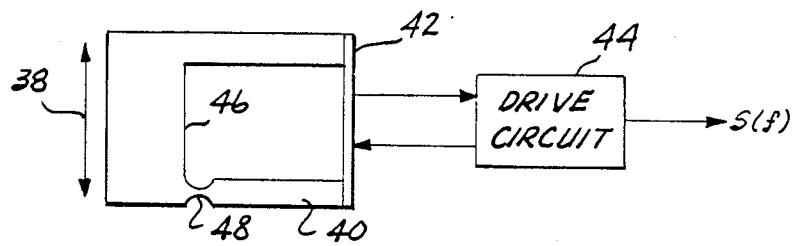
FIG. 2 is a schematic view of a prior art force to frequency type of accelerometer.

FIG. 2 illustrates the use of an oscillator of the type shown in FIG. 1 in an accelerometer for measuring acceleration along sensitive axis 38. The accelerometer comprises proof mass 40, force sensing element 42, drive circuit 44 and support 46. The force sensing element preferably comprises a quartz crystal having a double-ended tuning fork construction, as illustrated in U.S. Pat. No. 4,215,570. Drive circuit 44 causes the force sensing element to vibrate at a particular resonant frequency f, and the output of drive circuit 44 is a signal S at such frequency. Proof mass 40 is mounted to support 46 by flexure hinge 48, the flexure hinge permitting motion of the proof mass about an axis that passes through the flexure hinge and that is perpendicular to the plane of the drawing in FIG. 2. Force sensing element 42 is aligned parallel to sensitive axis 38, and has one end attached to support 46 and a second end attached to proof mass 40. The proof mass is thereby suspended at one end by the flexure hinge and at its other end by the force sensing element. An acceleration along sensitive axis 38 causes proof mass 40 to move slightly along sensitive axis 38 and thereby exert a tension or compression force on force sensing element 42. The tension or compression force will cause the resonant frequency f of the force sensing element to increase or decrease, respectively. The force sensing element therefore operates as a force to frequency converter that frequency modulates an acceleration signal onto a carrier signal, the carrier signal being the zero acceleration resonant frequency of the force sensing element.

Figure 3:
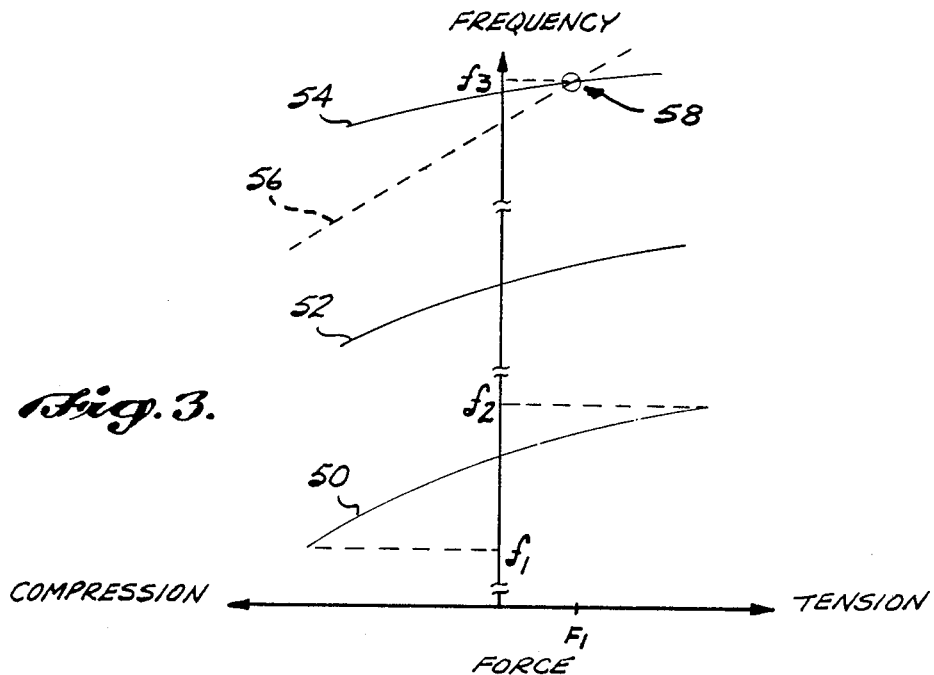
FIG. 3 is a graph showing the production of an activity dip in the output of a force-to-frequency converter.

It is well known that force sensing elements, such as the above-described double-ended tuning fork element, sometimes include activity dips or local nonlinearities in their force to frequency characteristics. If such an activity dip occurs within the operating range of the accelerometer, erroneous output may result. One reason for the occurrence of activity dips is schematically illustrated in FIG. 3. Curve 50 represents the force to frequency characteristic of a double-ended tuning fork quartz crystal operating in its fundamental vibration mode. In such fundamental mode, the two arms of the crystal oscillate towards and away from one another, 180° out of phase, with nodes at the ends of each arm. In order to sustain oscillation along curve 50, the crystal must be driven by a drive signal having a fundamental frequency f between $f_1$ and $f_2$. However, if the drive signal is digital, i.e., if the drive signal is a square wave at frequency f in the range $f_1$-$f_2$, then the drive signal will also contain odd harmonics of the fundamental f. The third ($3f$) and fifth ($5f$) odd harmonics of the fundamental frequency f are represented by curves 52 and 54, respectively. Dashed curve 56 represents the force to frequency characteristic of the second overtone of the crystal, i.e., curve 56 represents oscillation of the crystal in a mode in which each arm of the double-ended tuning fork contains a central node. Curves 54 and 56 intersect at point 58. As a result, if the crystal is driven by a drive signal having an appreciable harmonic component at $5f$, the oscillator may well contain an activity dip at force $F_1$ corresponding to point 58, i.e., at input force $F_1$, the crystal may tend to oscillate at frequency $f_3$.

Figure 4:
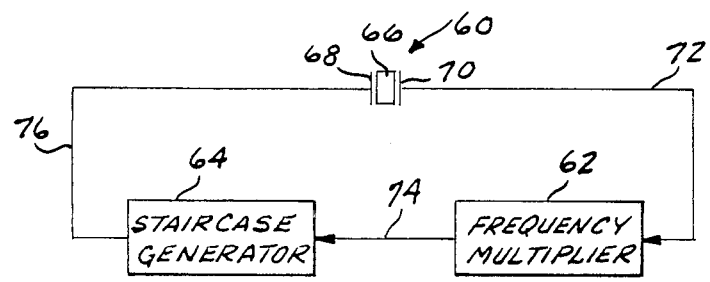
FIG. 4 is a block diagram of the oscillator and drive circuit of the present invention.
Figure 5A:
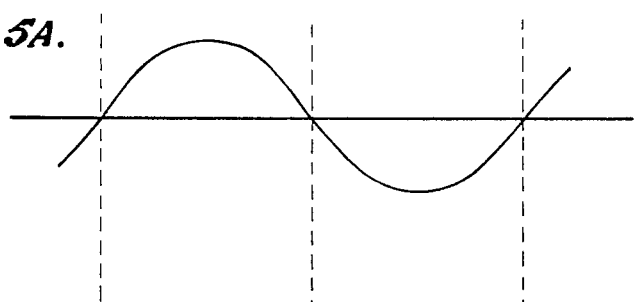
FIGS. 5A, 5B and 5C are waveforms corresponding to FIG. 4.
Figure 5B:
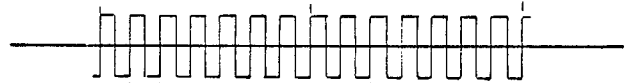

Traditional ways for avoiding activity dips are to design the accelerometer such that the activity dips are outside the operating frequency range, or to drive the crystal with a sinusoidal drive signal in which overtones are essentially absent. The present invention provides a technique for driving the crystal with a digital-type signal in which undesired harmonics in the drive signal are suppressed. A preferred embodiment of the oscillator of the present invention is shown in FIG. 4. The oscillator includes resonator 60, frequency multiplier 62, and staircase generator 64. Resonator 60 includes crystal 66 of a piezoelectric material such as crystalline quartz, and electrodes 68 and 70 formed on the body. Mechanical vibration of crystal 66 at frequency f produces a corresponding analog, essentially sinusoidal signal on line 72, also at frequency f, that is input to frequency multiplier 62. An example of the signal on line 72 is shown in FIG. 5A. Frequency multiplier 62 converts the analog signal on line 72 to a digital (e.g., square wave) signal, and multiplies the frequency of the square wave signal by an integer N, to produce a higher frequency intermediate signal on line 74. An example of the signal on line 74 is shown in FIG. 5B, for the case in which N=14.

Figure 5C:
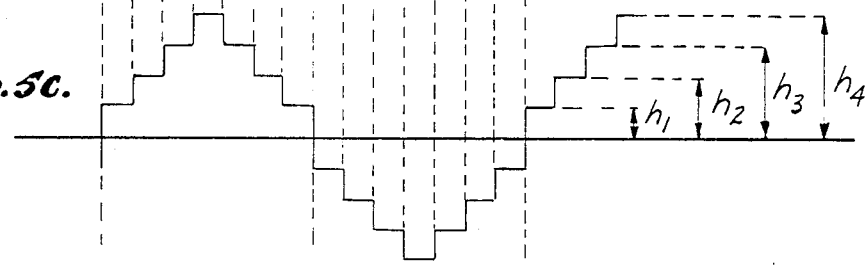

Staircase generator 64 receives the intermediate signal on line 74, and produces a pseudosinusoidal staircase drive signal on line 76. An example of the staircase drive signal is shown in FIG. 5C. The staircase drive signal on line 76 has a fundamental frequency f that is the same as the frequency of the signal on line 72 (FIG. 5A). The staircase drive signal also has the general form of a sinusoid. For the purpose of the present invention, the term "pseudosinusoidal" refers to a signal having a staircase form, i.e., having a discrete number of amplitude levels, and also having an overall form that approximates a sine wave. By comparing FIGS. 5B and 5C, it can be seen that the pseudosinusoidal drive signal shifts to a new level on each rising edge of the intermediate signal on line 74. More generally, the drive signal shifts to a new level at a series of switching times that are separated from one another in time by integer multiples of the period of the intermediate signal. In the staircase drive signal shown in FIG. 5C, the level shifts once for each cycle of the intermediate signal. Thus for the case illustrated in FIGS. 5B and 5C wherein N=14, the drive signal has fourteen steps for each cycle of frequency f. However due to symmetry, the illustrated drive signal is fully defined by four discrete nonzero amplitude levels, labeled $h_1$-$h_4$ at the righthand side of FIG. 5C. In general, for staircase drive signals of the type illustrated in FIG. 5C, the number of steps N will be equal to 4M-2, where M is the number of discrete nonzero amplitude levels. This relationship will vary for other forms of staircase drive signals, as described more fully below.

In accordance with the present invention, the amplitudes $h_1$-$h_4$ are adjusted such that predetermined harmonic components are absent from the drive signal. More particularly, it can be shown that for a staircase drive signal of the form shown in FIG. 5C, the signal will contain only odd harmonics of the fundamental frequency f, i.e., harmonics at $3f$, $5f$, $7f$ . . . The amplitude of each harmonic can be expressed mathematically as a sum of the contributions from each of the N voltage steps using Fourier analysis. Since there are M independent variables, up to M such equations can be written. After choosing the fundamental to have the desired amplitude, M−1 harmonics can be designed to have zero amplitudes. As one example, if the fundamental frequency f was 40 kilohertz, and if N was equal to 30, then M−1 would equal 7 for the staircase function shown in FIG. 5C, and harmonics up to 600 kilohertz could be eliminated, leaving the lowest ripple frequency in the drive at 680 kilohertz. In such a system, the availability of an intermediate signal on line 74 at 1.2 megahertz would be a no cost added benefit.

An example of the calculation of the appropriate amplitude levels will now be described in connection with FIG. 6. For the staircase function shown in FIG. 6, N=10 and M=3. The staircase waveform can be expressed as $$f(x) = \sum_{n=0}^{\infty} (a_n \cos nx + b_n \sin nx) \quad (1)$$

where for a time varying voltage, $x = \omega t$. From the symmetry of the staircase function, $$a_0 = a_1 = a_2 = \ldots a_k = 0 \quad (2)$$

$$b_2 = b_4 = b_6 \ldots = 0 \quad (3)$$

The coefficients $b_k$ for odd k are given by:

$$b_k = \frac{1}{\pi} \int_{-\pi}^{\pi} f(x) \sin kx \, dx \quad (4)$$

Figures 6, 7:
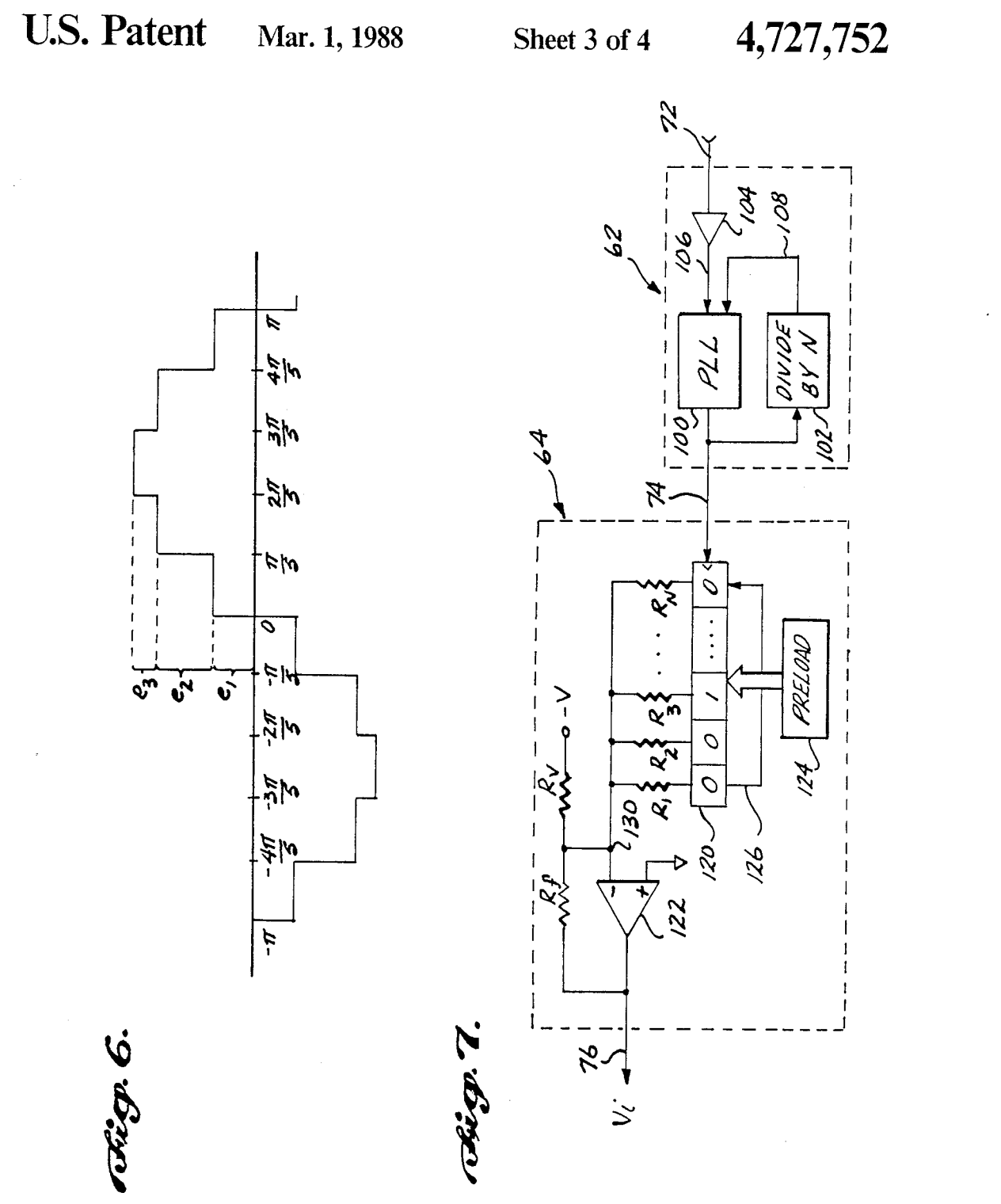

For convenience, the amplitude levels of the staircase function of FIG. 6 will be expressed by the illustrated differential amplitude parameters $e_1$, $e_2$ and $e_3$, rather than by the absolute amplitudes $h_1$, $h_2$ and $h_3$ of the steps. Equation (4) can then be expanded and rearranged to produce $$b_k = \frac{2}{\pi} \int_0^{\pi} e_1 \sin kx \, dx + \frac{2}{\pi} \int_{\frac{\pi}{5}}^{\frac{4\pi}{5}} e_2 \sin kx \, dx + \frac{2}{\pi} \int_{\frac{2\pi}{5}}^{\frac{3\pi}{5}} e_3 \sin kx \, dx \quad (5)$$

In this series, $b_1$ is the amplitude of the fundamental, and we can choose $e_2/e_1$ and $e_3/e_1$ to give desired values for any two harmonics. This example will consider the case where one wishes to have $b_3$ and $b_5$ equal to zero, so that the first nonzero harmonic is the term containing $b_7$. Setting $b_1$ equal to $E_0$ and $b_3$ and $b_5$ equal to zero in equation 5, leads to the following matrix equation $$\begin{bmatrix} 1 & \cos \frac{\pi}{5} & \cos \frac{2\pi}{5} \\ 1 & \cos \frac{3\pi}{5} & \cos \frac{6\pi}{5} \\ 1 & -1 & 1 \end{bmatrix} \begin{bmatrix} e_1 \\ e_2 \\ e_3 \end{bmatrix} = \begin{bmatrix} \frac{\pi}{4} E_o \\ 0 \\ 0 \end{bmatrix} \quad (6)$$

This equation can readily be solved to produce the values for $e_1$, $e_2$ and $e_3$ that will eliminate the third and fifth harmonics. For the more general case in which there are M differential voltage levels $e_1, e_2 \ldots e_M$, equation (6) takes the following form $$\begin{bmatrix} 1 & \cos d & \ldots & \cos(m-2)d & \cos(m-1)d \\ 1 & \cos 3d & \ldots & \cos 3(m-2)d & \cos 3(m-1)d \\ \vdots & \vdots & & \vdots & \vdots \\ 1 & \cos(2m-3)d & \ldots & \cos(2m-3)(m-2)d & \cos(2m-3)(m-1)d \\ 1 & -1 & \ldots & \pm 1 & \mp 1 \end{bmatrix} \begin{bmatrix} e_1 \\ e_2 \\ \vdots \\ e_{M-1} \\ e_M \end{bmatrix} = \begin{bmatrix} \frac{\pi}{4} E_o \\ 0 \\ \vdots \\ 0 \\ 0 \end{bmatrix} \quad (7)$$

where $d = \pi/(2m-1)$, and where the sign of the last row of the M by M matrix alternates between adjacent columns. In this general case, the first nonzero harmonic is the term containing $b_{2M+1}$, which term is typically small, being attenuated by $1/(2M+1)$ or more with respect to the fundamental. This frequency will also be comparatively high, and therefore may be ignored in some cases are easily filtered in other cases. For example, if M=10, and if k=1 corresponds to 40 kilohertz, then the first nonzero harmonic will be at 840 kilohertz.

The present invention is not limited to the case in which it is desired that the first M−1 odd harmonics be equal to zero. For example, if it is known that certain odd harmonics are troublesome, while others are not, the levels $e_1 \ldots e_M$ may be selected to make any M−1 odd harmonics zero. For example with M=10, one could produce a staircase function in which $b_3$, $b_5$, $b_7$, $b_9$, $b_{11}$, $b_{13}$, $b_{17}$, $b_{19}$, and $b_{21}$ were zero, while $b_{15}$ and odd harmonics $b_{23}$ and higher could be permitted to have finite values.

Preferred implementations for frequency multiplier 62 and staircase generator 64 are shown in FIG. 7. Frequency multiplier 62 comprises phase lock loop 100, divide by N circuit 102 and comparator 104. Comparator 104 converts the analog, sinusoidal signal on line 72 to a corresponding square wave signal on line 106. The signal on line 106 forms one input to phase lock loop 100, the other input being the output of divide by N circuit 102 on line 108. The input to divide by N circuit 102 is the output signal from phase lock loop 100 on line 74. As is well known, the circuit shown in FIG. 7 will produce an output signal on line 74 having a frequency equal to N times the frequency of the input signal on line 72.

The embodiment of staircase generator 64 shown in FIG. 7 comprises N bit shift register 120, operational amplifier 122, preload circuit 124, feedback resistor $R_f$, biasing resistor $R_V$, and amplitude setting resistors $R_1 \ldots R_N$. The intermediate signal on line 74 at frequency Nf is connected to the clock input terminal of shift register 120. Shift register 120 is preloaded from preload circuit 124 with a predetermined bit pattern comprising a single value of one and N−1 zeros. This arrangement causes the single one value to shift one position in shift register 120 for each cycle of the intermediate signal. Line 126 connects the serial output terminal of the shift register to the serial input terminal of the shift register, such that the value "1" continuously recycles through the shift register. Shift register 120 includes N parallel output terminals, and each parallel output terminal is connected to node 130 via one of amplitude setting resistors $R_1 \ldots R_N$. Node 130 is connected to the inverting input terminal of operational amplifier 122, to negative voltage supply $-V$ through biasing resistor $R_V$, and to the output terminal of operational amplifier 122 via feedback resistor $R_f$. The noninverting input of operational amplifier 122 is connected to ground. As a result of this arrangement, node 130 is a virtual ground, and analysis of the current flows into and out of node 130 leads to the following expression for the voltage $V_i$ at the output of operational amplifier 122:

$$V_i = VR_f\left(\frac{1}{R_i} - \frac{1}{R_v}\right) \tag{8}$$

where $R_i = R_1, R_2 \ldots R_N$. Thus each output amplitude $V_i$ can readily be controlled by selection of amplitude setting resistor $R_i$, and a predetermined staircase drive signal can thus be generated. In equation (8), it is assumed that the bit of shift register 120 that has the value one produces an output voltage of $+V$ at the corresponding parallel output terminal, while zero bits produce output voltages of zero.

Figure 8:
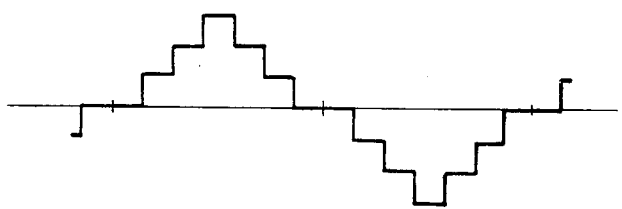
FIG. 8 is a graph showing a second preferred embodiment of the staircase drive signal; and, FIG. 9 is a graph showing a third preferred embodiment of the staircase drive signal.
Figure 9:
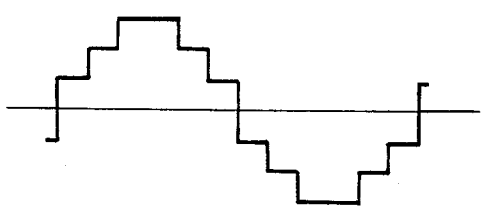

FIGS. 8 and 9 provide two alternative forms of the staircase drive signal produced by staircase generator 64. In the form shown in FIG. 8, the amplitude of the staircase signal is zero for two cycles of the intermediate signal each time that the staircase signal passes through the zero voltage level. In the staircase signal shown in FIG. 9, the staircase function is at its maximum amplitude for two successive cycles of the intermediate signal. In the arrangement shown in FIG. 8, the number of nonzero discrete amplitude levels M and the frequency multiplication factor N are related by $$N = 4M + 2 \tag{9}$$

while for the staircase signal shown in FIG. 9, the corresponding relationship is $$N = 4M \tag{10}$$

It will be appreciated that other staircase functions would also be suitable. However it is believed that one of the three illustrated forms of the staircase function will suffice for most applications.

If it is desired to include an amplitude servo in the circuit shown in FIG. 7, such a servo can easily be accomplished by providing a detector circuit at the crystal output, and using the detector output, with suitable gain, as a power supply for the shift register. This arrangement will vary the voltage provided to amplitude setting resistor $R_i$ when the value one is in the corresponding shift register bit, as well as the voltage across $R_v$, thereby adjusting the output of the staircase generator, as illustrated above by equation (8).

While the preferred embodiments of the invention have been illustrated and described, variations will be apparent to those skilled in the art. For example, an alternative to the return line 126 would be to trigger the preload circuit 124 with each rising edge of the signal on line 106, thus guaranteeing that the staircase function on line 76 will always start and run in exact phase synchronism with the signal on line 72. Accordingly, the invention is not to be limited by the described embodiments, but is instead to be determined by reference to the following claims.

The embodiments of the invention in which an exclusive property or privilege is claimed are defined as follows:

1. An accelerometer for measuring acceleration along a sensitive axis, comprising:
   a support;
   a proof mass;
   mounting means for mounting the proof mass to the support such that the proof mass can undergo movement relative to the support along the sensitive axis; and
   a transducer for reacting to said movement by producing a signal indicative of acceleration along the sensitive axis, the transducer including:
   (a) a resonator comprising a piezoelectric crystal connected between the proof mass and the support and constructed to undergo mechanical vibration at a frequency f that varies with the force applied to the crystal in response to an electrical drive signal having a harmonic component at frequency f, and means for producing an electrical resonator signal corresponding to said mechanical vibration; and
   (b) drive circuit means including means for receiving the resonator signal and for producing the drive signal in the form of a periodic pseudosinusoidal staircase function at a fundamental frequency f, the staircase function having N steps and M discrete nonzero amplitude levels per period, M and N being integers greater than 1 with M being less than N, the circuit means including means for producing the M amplitude levels such that predetermined harmonics of the fundamental frequency f are not present in the drive signal.

2. The accelerometer of claim 1, wherein the circuit means comprises first circuit means for receiving the resonator signal and for producing a periodic intermediate signal having frequency Nf and period 1/Nf, and second circuit means including means for receiving the intermediate signal and for producing the drive signal.

3. The accelerometer of claim 2, wherein the amplitude level of the drive signal changes at a series of switching times that are spaced from one another in time by integer multiples of the period of the intermediate signal.

4. The accelerometer of claim 3, wherein N is equal to 4M minus 2, and wherein the amplitude level of the drive signal always has a non-zero value and changes once for each period of the intermediate signal.

5. The accelerometer of claim 3, wherein N is equal to 4M plus 2, and wherein the amplitude level of the drive signal is substantially equal to zero for two successive periods of the intermediate signal each time that the drive signal passes between positive and negative amplitude levels.

6. The accelerometer of claim 3, wherein N is equal to 4M, wherein the amplitude level of the drive signal is never equal to zero, and wherein the amplitude level of the drive signal remains constant for two periods of the intermediate signal whenever the amplitude level reaches its greatest positive and greatest negative values.

7. The accelerometer of claim 2, wherein the second circuit means comprises:
   an N bit shift register having a clock terminal to which the intermediate signal is coupled, a serial input terminal, a serial output terminal, and N parallel output terminals;
   means for preloading the shift register with a predetermined bit pattern;
   means for causing the contents of the shift register to rotate in response to the intermediate signal, such that data shifted out of the serial output terminal is reintroduced at the serial input terminal; and,
   a level generation circuit for producing the drive signal, the level generation circuit being connected to the N parallel output terminals of the shift register such that a predetermined amplitude level of the drive signal is produced for each position of the bit pattern in the shift register.

8. The accelerometer of claim 7, wherein the level setting circuit comprises an operational amplifier having an inverting input terminal, and a plurality of coupling resistors, each coupling resistor coupling the inverting input terminal of the operational amplifier to one of the parallel output terminals of the shift register.

9. An oscillator, comprising:
   a resonator comprising a piezoelectric crystal constructed to undergo mechanical vibration at a frequency f in response to an electrical drive signal having a harmonic component at frequency f, and means for producing an electrical resonator signal corresponding to said mechanical vibration; and
   drive circuit means including means for receiving the resonator signal and for producing the drive signal in the form of a periodic pseudosinusoidal staircase function at a fundamental frequency f, the staircase function having N steps and M discrete nonzero amplitude levels per period, M and N being integers greater than 1 with M being less than N, the circuit means including means for producing the M amplitude levels such that predetermined harmonics of the fundamental frequency f are not present in the drive signal.

10. The oscillator of claim 9, wherein the circuit means comprises first circuit means for receiving the resonator signal and for producing a periodic intermediate signal having frequency Nf and period 1/Nf, and second circuit means including means for receiving the intermediate signal and for producing the drive signal.

11. The oscillator of claim 10, wherein the amplitude level of the drive signal changes at a series of switching times that are spaced from one another in time by integer multiples of the period of the intermediate signal.

12. The oscillator of claim 11, wherein N is equal to 4M minus 2, and wherein the amplitude level of the drive signal always has a non-zero value and changes once for each period of the intermediate signal.

13. The oscillator of claim 11, wherein N is equal to 4M plus 2, and wherein the amplitude level of the drive signal is substantially equal to zero for two successive periods of the intermediate signal each time that the drive signal passes between positive and negative amplitude levels.

14. The oscillator of claim 11, wherein N is equal to 4M, wherein the amplitude level of the drive signal is never equal to zero, and wherein the amplitude level of the drive signal remains constant for two periods of the intermediate signal whenever the amplitude level reaches its greatest positive and greatest negative values.

15. The oscillator of claim 10, wherein the second circuit means comprises:
   an N bit shift register having a clock terminal to which the intermediate signal is coupled, a serial input terminal, a serial output terminal, and N parallel output terminals;
   means for preloading the shift register with a predetermined bit pattern;
   means for causing the contents of the shift register to rotate in response to the intermediate signal, such that data shifted out of the serial output terminal is introduced at the serial input terminal; and,
   a level generation circuit for producing the drive signal, the level generation circuit being connected to the N parallel output terminals of the shift register such that a predetermined amplitude level of the drive signal is produced for each position of the bit pattern in the shift register.

16. The oscillator of claim 15, wherein the level setting circuit comprises an operational amplifier having an inverting input terminal, and a plurality of coupling resistors, each coupling resistor coupling the inverting input terminal of the operational amplifier to one of the parallel output terminals of the shift register.

* * * * *